US010839686B2

(12) United States Patent
Wunder et al.

(10) Patent No.: US 10,839,686 B2
(45) Date of Patent: Nov. 17, 2020

(54) SYSTEM AND METHOD FOR DISTRIBUTED PARKING AREA MAP GENERATION AND PARKING AREA SERVICE USING IN-VEHICLE SENSORS

(71) Applicant: Robert Bosch GmbH, Stuttgart (DE)

(72) Inventors: Gregor Wunder, Braunschweig (DE);
Frederik Brockmann, Stuttgart (DE);
Naveen Ramakrishnan, Campbell, CA (US); Manuel Maier, Esslingen (DE);
Rahul Kapoor, San Jose, CA (US);
Alexander Hagmeister, Ludwigsburg (DE); Karsten Thalheimer, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/270,413

(22) Filed: Feb. 7, 2019

(65) Prior Publication Data

US 2019/0251842 A1 Aug. 15, 2019

Related U.S. Application Data

(60) Provisional application No. 62/630,945, filed on Feb. 15, 2018.

(51) Int. Cl.
| G08G 1/14 | (2006.01) |
| H04W 4/40 | (2018.01) |
| G06K 9/00 | (2006.01) |
| G07C 5/00 | (2006.01) |
| G08G 1/0967 | (2006.01) |
| G06Q 10/00 | (2012.01) |

(52) U.S. Cl.
CPC ......... *G08G 1/143* (2013.01); *G06K 9/00812* (2013.01); *G06Q 10/00* (2013.01); *G07C 5/008* (2013.01); *G08G 1/096725* (2013.01); *G08G 1/147* (2013.01); *H04W 4/40* (2018.02)

(58) Field of Classification Search
CPC .... G06K 9/00812; G08G 1/147; G08G 1/161; G08G 1/146; G08G 1/04; B60W 30/0956; H04W 4/40; H04W 4/44
See application file for complete search history.

(56) References Cited

U.S. PATENT DOCUMENTS

| 9,299,258 B1 * | 3/2016 | Foster ................... G08G 1/146 |
| 10,386,845 B1 * | 8/2019 | Konrardy .............. G08G 1/146 |

(Continued)

*Primary Examiner* — Mirza F Alam
(74) *Attorney, Agent, or Firm* — Maginot, Moore & Beck LLP

(57) ABSTRACT

A method of operating a community parking system includes generating sensor data with a plurality of vehicles corresponding to vehicle parking spaces and parked vehicles located in a region, transmitting the sensor data to a parking data system, and generating parking map data with the parking data system based on the sensor data, the parking map data including a location of the vehicle parking spaces. The method also includes generating parking service data with the parking data system based on the sensor data, the parking service data identifying a status of each vehicle parking space as either occupied or unoccupied, and transmitting the parking service data to a particular vehicle of the plurality of vehicles to assist an operator of the particular vehicle in locating one of the vehicle parking spaces having an unoccupied status.

16 Claims, 6 Drawing Sheets

(56) References Cited

U.S. PATENT DOCUMENTS

| | | | |
|---|---|---|---|
| 2014/0266802 A1* | 9/2014 | Love | G08G 1/144 340/932.2 |
| 2016/0225035 A1* | 8/2016 | Gill | G06Q 30/0278 |
| 2017/0169712 A1* | 6/2017 | Penilla | G05D 1/0011 |

* cited by examiner

SYSTEM AND METHOD FOR DISTRIBUTED PARKING AREA MAP GENERATION AND PARKING AREA SERVICE USING IN-VEHICLE SENSORS

This application claims the benefit of priority of U.S. provisional application Ser. No. 62/630,945, filed on Feb. 15, 2018 the disclosure of which is herein incorporated by reference in its entirety.

FIELD

This disclosure relates generally to the automotive field, and, more particularly, to systems and methods that assist in parking of motor vehicles.

BACKGROUND

In-vehicle information systems provide a variety of services to vehicle operators, such as driving directions and points of interest. When arriving at a point of interest, finding a parking space is often a challenge to an operator that may consume time and result in the waste of a petrochemical fuel or electrical power from a battery as the operator (human or autonomous) navigates the area near the point of interest to find an unoccupied parking space. Some controlled parking facilities, such as parking garages, include sensor systems that directly monitor the available parking spaces at fixed locations and display the available parking spaces to operators or transmit the information to autonomous driving systems. Such systems, however, are impractical for uncontrolled parking areas such as street-side parking spaces that are common in many cities and towns. Consequently, improvements to technology that enable the efficient identification and transmission of available parking spaces to in-vehicle information systems would be beneficial to improving the efficiency and reducing the environmental impact of operating automobiles.

SUMMARY

According to an exemplary embodiment of the disclosure, a method of operating a community parking system includes generating sensor data with a plurality of vehicles corresponding to vehicle parking spaces and parked vehicles located in a region, transmitting the sensor data to a parking data system, and generating parking map data with the parking data system based on the sensor data. The parking map data includes a location of the vehicle parking spaces. The method also includes generating parking service data with the parking data system based on the sensor data, the parking service data identifying a status of each vehicle parking space as either occupied or unoccupied, and transmitting the parking service data to a particular vehicle of the plurality of vehicles to assist an operator of the particular vehicle in locating one of the vehicle parking spaces having an unoccupied status.

According to another exemplary embodiment of the disclosure, a parking data system includes a network adapter and a controller. The network adapter is configured to receive sensor data generated by a plurality of vehicles. The sensor data corresponds to vehicle parking spaces and parked vehicles located in a region. The controller is operably connected to the network adapter. The controller is configured to generate parking map data based on the sensor data, the parking map data including a location of the vehicle parking spaces, to generate parking service data with the parking data system based on the sensor data, the parking service data identifying a status of each vehicle parking space as either occupied or unoccupied, and to transmit the parking service data to a particular vehicle of the plurality of vehicles to assist an operator of the particular vehicle in locating one of the vehicle parking spaces having an unoccupied status.

In a further exemplary embodiment, a community parking system includes a parking data system having a data valuation engine operably connected to a plurality of vehicles. The data valuation engine is configured to determine valuation data for monetarily compensating original equipment manufacturers (OEMs) of vehicles that provide high-quality sensor data to the parking data system. The sensor data is used by the parking data system to generate parking map data corresponding to the locations of parking spaces for parking the vehicles. The community parking system updates the parking map data at regular intervals (e.g. weekly, monthly, yearly) to identify long-term parking spaces that are used for vehicle parking. The parking data system, in one embodiment, performs a filtering process to identify and to use only high-quality sensor data to generate the parking map data. Moreover, for valuation purposes, the data valuation engine is configured to determine which vehicle or vehicles of the plurality of vehicles located a particular parking space.

The community parking system also uses the sensor data to determine which of the identified parking spaces of the parking map data are presently occupied or unoccupied. The community parking system is configured to transmit parking space data to a vehicle upon request. The parking space data enables an operator of the vehicle (human or an electronic autonomous operator) to locate an unoccupied parking space in an extremely short period of time. The community parking system is configured to share the parking map data that has been mapped by a first vehicle with the operator of a second vehicle. The operator of the vehicle searching for an available parking space can trust the shared parking data as it is regularly/periodically updated based using the sensor data of other vehicles.

In another embodiment, the data valuation engine of the community parking system implements a "stack approach" in determining a level of compensation for each participating OEM. The stack approach rewards first movers and equitably compensates the OEMs based on changes to the parking map data detected by the parking data system using the sensor data.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
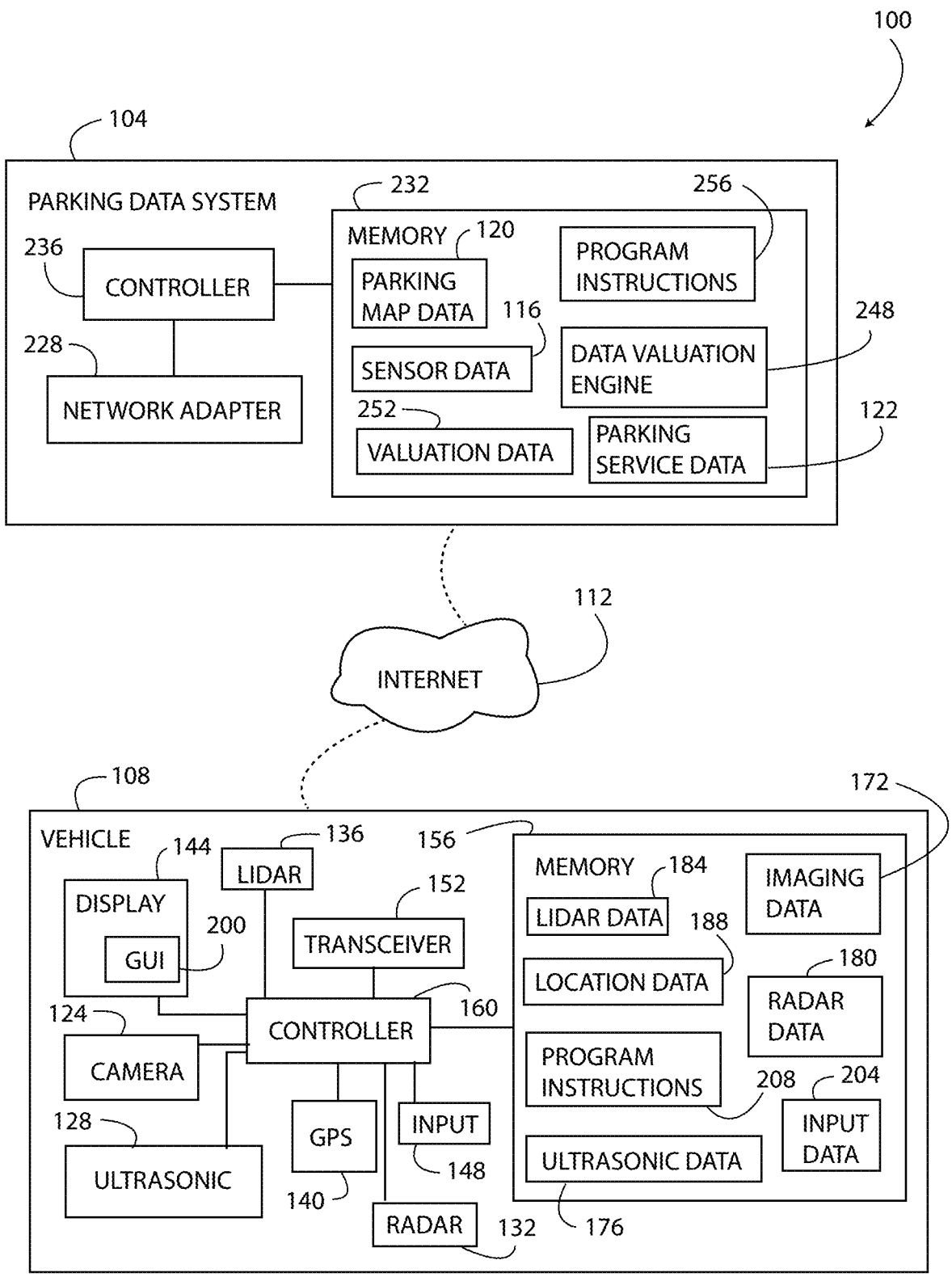
FIG. 1 is a block diagram of a community parking system including a parking data system and a vehicle configured for electronic communication via the Internet.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a community parking system 100 includes a parking data system 104 and a vehicle 108 each connected to the Internet 112. The parking data system 104 is configured to receive sensor data 116 generated by the vehicle 108 and to generate parking map data 120 including data corresponding to parking spots/areas for parking the vehicle 108. The sensor data 116 is generated by vehicles 108 of various participating original equipment manufacturers (OEMs). The parking data system 104 includes a data valuation engine 248 configured to determine valuation data 252 corresponding to monetary compensation amounts owed to each participating OEM. Each element of the community parking system 100 is described herein.

The community parking system 100 is configured to operate with many hundreds or many thousands of the vehicles 108. The exemplary vehicle 108 is one of a plurality of vehicles and includes a camera 124, an ultrasonic sensor 128, a radar sensor 132, a LIDAR sensor 136, a GPS receiver 140, a display device 144, an input device 148, a transceiver 152, and a memory 156 each operably connected to a controller 160. The camera 124, also referred to herein as an imaging device, is positioned on the vehicle 108 and is configured to generate imaging data 172 representative of an exterior area (i.e. outside of the vehicle 108) in a field of view of the camera 124. The imaging data 172 is transmitted from the camera 124 to the controller 160 and is stored in the memory 156. In one embodiment, the camera 124 is a front-mounted camera configured to generate imaging data 172 corresponding to a view extending from the front of the vehicle 108. In another embodiment, the camera 124 is a rear camera configured to generate imaging data 172 corresponding to a view extending from the rear of vehicle 108, as is typically provided with a "backup camera." In a further embodiment, the camera 124 is a side-mounted camera configured to generate imaging data 172 corresponding to a view extending from either the driver's side or the passenger's side of the vehicle 108. The camera 124 may be configured as a thermal camera, an infrared camera, and/or a visible light camera. The vehicle 108 may include any one or more of the above-described cameras. Moreover, in some embodiments, the vehicle 108 does not include the camera 124 and does not generate the imaging data 172.

With continued reference to FIG. 1, the ultrasonic sensor 128 is positioned on the vehicle 108 and is configured to generate ultrasonic data 176 corresponding to a distance between the ultrasonic sensor 128 and elements near the vehicle 108. The vehicle 108 may include any number of ultrasonic sensors 128, which may be positioned at the front, rear, passenger's side, and/or driver's side of the vehicle 108. The ultrasonic sensor 128 is typically used to detect elements near the vehicle 108 that are located within a first predetermined distance from the vehicle 108. In some embodiments, the vehicle 108 does not include the ultrasonic sensor 128 and does not generate the ultrasonic data 176.

The radar sensor 132 is positioned on the vehicle 108 and is configured to generate radar data 180 corresponding to a distance between the vehicle 108 and elements near the vehicle 108. The vehicle 108 may include any number of radar sensors 132, which may be positioned at the front, rear, passenger's side, and/or driver's side of the vehicle 108. In one embodiment, the radar sensor 132 uses millimeter-wave radar, but in other embodiments, any suitable type of radar is utilized. The radar sensor 132 is typically used to detect elements near the vehicle 108 that are located within a second predetermined distance from the vehicle 108. The second predetermined distance associated with the radar sensor 132 is typically greater than the first predetermined distance associated with the ultrasonic sensor 128. In some embodiments, the vehicle 108 does not include the radar senor 132 and does not generate the radar data 180.

As shown in FIG. 1, the LIDAR sensor 136, which is also referred to as a LADAR sensor, is positioned on the vehicle 108 and is configured to generate LIDAR data 184 representative of an area and the objects in the area that are near the vehicle 108. LIDAR is an acronym for light detection and ranging. The LIDAR sensor 136, in one embodiment, uses light and the reflection of the light from nearby elements to generate the LIDAR data 184. In some embodiments, the vehicle 108 does not include the LIDAR senor 136 and does not generate the LIDAR data 136.

The Global Positioning System receiver 140 is configured to receive GPS signals from a GPS satellite (not shown). The GPS receiver 140 processes the received GPS signals and generates location data 188 corresponding to a location of the vehicle 108 on the Earth. The location data 188, in one embodiment, includes latitude and longitude information. In some embodiments, the vehicle 108 does not include the GPS receiver 140 and does not generate the location data 188. The GPS receiver 140, in some embodiments, is further configured to generate altitude data.

The transceiver 152 of the vehicle 108, which is also referred to as a wireless transmitter and receiver, is configured to wirelessly transmit the sensor data 116 from the vehicle 108 to the parking data system 104 and to wirelessly receive data from the parking data system 104 via the Internet 112. Thus, the transceiver 152 operably connects the vehicle 108 to the Internet 112 and to the parking data system 104. The sensor data 116 includes at least the imaging data 172, the ultrasonic data 176, the radar data 180, the LIDAR data 184, and the location data 188. In other embodiments, the transceiver 152 sends and receives data using a cellular network, a wireless local area network ("Wi-Fi"), a personal area network, and/or any other wireless network. Accordingly, the transceiver 152 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The display device 144, in one embodiment, is a liquid crystal display (LCD) panel configured to display text, images, and other visually comprehensible data. The display device 144, in another embodiment, is any display as desired by those of ordinary skill in the art, including, but not limited to, an active-matrix organic light-emitting diode display.

Figure 3:
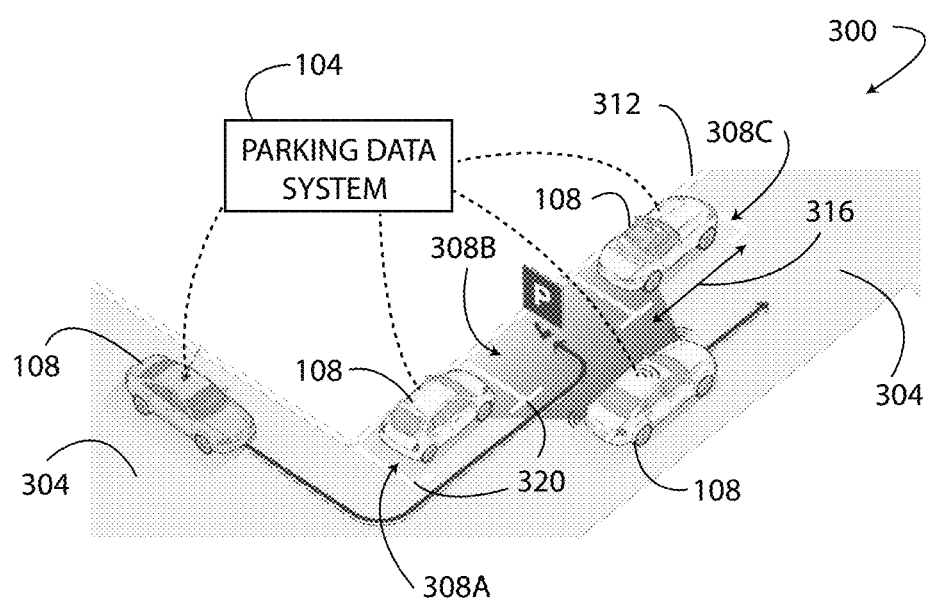
FIG. 3 is a block diagram illustrating an exemplary street portion, several parking spaces, and several vehicles of the community parking system of FIG. 1.

The display device 144, as shown in FIG. 1, is configured to display a graphical user interface (GUI) 200 for enabling an operator or the vehicle 108 or a passenger of the vehicle 108 to interact with the parking data system 104. The GUI 200 may display data from the memory 156 and/or data from the parking data system 104, such as the location and the availability of nearby available parking spots 308 (FIG. 3).

The input device 148 includes a plurality of buttons, in one embodiment, configured to enable an operator of the vehicle 108 to generate input data 204. For example, the input device 148 is configured to enable a user to enter text data and to manipulate objects shown on the display device 144. In another embodiment, the input device 148 is a touchscreen applied over the display device 144 that is configured to respond to the touch of a finger or a stylus. In yet another embodiment, the input device 148 is any device configured to generate an input signal and the input data 204, as desired by those of ordinary skill in the art.

The memory 156, in one embodiment, is configured to store the imaging data 172, the ultrasonic data 176, the radar data 180, the LIDAR data 184, the location data 188, the input data 204, and program instruction data 208. The memory 156 is also referred to herein as a non-transient computer readable medium.

The controller 160 of the vehicle 108 is configured to execute the program instruction data 208 in order to operate the camera 124, the ultrasonic sensor 128, the radar sensor 132, the LIDAR sensor 136, the GPS receiver 140, the display device 144, the input device 148, the transceiver 152, and the memory 156. The controller 160 is provided as at least one microcontroller and/or microprocessor.

As shown in FIG. 1, the parking data system 104 of the community parking system 100 includes a network adapter 228 and a memory 232 operably connected to a controller 236. The network adapter 228 is configured to operably connect the parking data system 104 to the Internet 112, such that the parking data system 104 is configured to receive electronic data from other Internet-connected devices and to send electronic data to other Internet-connected devices, such as the vehicle 108. In the exemplary embodiment, the parking data system 104 is shown in a location that is remote from the vehicle 108.

The memory 232 of the parking data system 104 is also referred to herein as a non-transient computer readable medium and is configured to store the transferred sensor data 116, parking map data 120, parking area service data 122, the data valuation engine 248, the valuation data 252, and program instruction data 256. The parking map data 120 corresponds to a regional road map and the location of vehicle parking spaces 308 along the roadways of the regional road map. For example, the parking map data 120 may include the location of a street 304 (FIG. 3) and the location of each publically available parking space 308 located on the street 304. The parking area service data 122 includes a present availability of the parking spaces 308 of the parking map data 120.

The controller 236 of the parking data system 104 is configured to execute the program instruction data 256 in order to operate the parking data system 104. The controller 236 is provided as at least one microcontroller and/or microprocessor.

Figure 2:
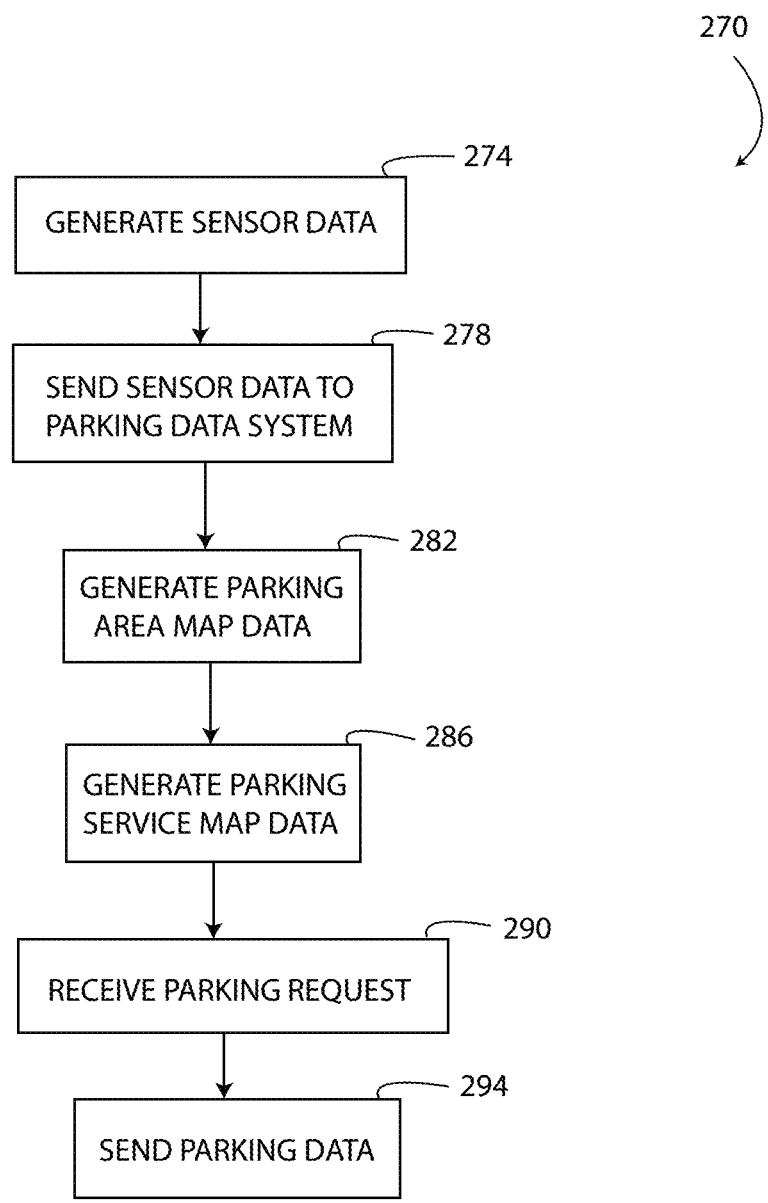
FIG. 2 is flowchart depicting an exemplary method of operating the community parking system of FIG. 1.

As shown in FIG. 2, an exemplary method 270 of operating the community parking system 100 includes, at block 274, generating the sensor data 116 with the vehicle 108. With reference to FIG. 3, a vehicle 108 is located in a region 300 and is driving on a street 304 that includes three vehicle street-side parking spaces 308A, 308B, 308C. The street-side parking spaces 308A, 308C are occupied by parked vehicles 108 and are unavailable. The parking space 308B is unoccupied and is available for parking. Each of the vehicles 108 generates the sensor data 116. The vehicles 108 shown in FIG. 3 may each be manufactured by the same OEM or by different OEMs.

For example, the vehicle 108 approaching parking space 308A is configured to use at least the radar sensor 132 and the GPS receiver 140 to scan the sides of the roads 304 as the vehicle 108 is moved, thereby generating the radar data 132 and the location data 188. Moreover, the vehicle 108 may be configured to use the camera 124 to generate imaging data 172 of the sides of the roads 304. Likewise, the vehicle 108 parked in parking space 308C, for example, uses the ultrasonic sensor 128 to generate ultrasonic data 176 corresponding to a location of a curb 312 that borders the parking space 308A and the distance 316 between the parking stripes 320 to determine a length of the parking space 308A (in meters, for example).

The vehicle 108 positioned alongside the street-side parking space 308B is an example of a vehicle 108 that driving past the parking space 308B without attempting to park in the parking space 308B. The vehicle 108 generates radar data 132 and location data 188, for example, to indicate that the parking space 308B is unoccupied and is presently available and to indicate that the parking spaces 308A, 308C are occupied and are presently unavailable. Accordingly, the sensor data 116 of the vehicle 108 is used by the parking data system 104 to provide "real-time" parking availability data for each parking space 308 that it moves past. The parking availability data is stored as the parking service data 122 in the memory 232.

The vehicles 108 typically generate the sensor data 116 in block 274 without requiring interaction from the operator of the vehicle 108. That is, the generation of the sensor data 116 does not inconvenience the operator or prevent the operator of the vehicle 108 from utilizing features of the vehicle 108.

Next, in block 278 the vehicles 108 electronically send the sensor data 116 to the parking data system 104 via the Internet 112. In one embodiment, the vehicles 108, when operational, send the sensor data 116 to the parking data system 104 periodically, such as once every five minutes (i.e. a predetermined time period) or once every ten minutes, depending on the embodiment. Moreover, the vehicles 108 may prioritize certain sensor data 116 over other sensor data 116. For example, radar data 180 that may be used to identify the availability of the parking spaces 308 may be sent more frequently, than the ultrasonic data 176 used to determine the size (i.e. length) of an existing parking space 308.

Next, in block 282 of the method 270 shown in FIG. 2, the parking data system 104 generates the parking map data 120 based on the received sensor data 116 generated by the vehicles 108. The parking data system 104 includes program instructions 256 for generating the parking map data 120, the parking service data 122, and the valuation data 252. The parking map data 120 corresponds to a street map or a roadways map of the region 300 and a location of each parking space 308 in the region 300 that is publically accessible. The parking service data 122 includes the present availability of each of the mapped parking spaces 308.

In generating the parking map data 120, the parking data system 104 filters the sensor data 116 generated by the vehicles 108 to identify useful data (i.e. high-quality data or valuable data) and unwanted data (i.e. low-quality data). The useful data is sensor data 116 that is useful in generating the parking map data 120 and/or the parking service data 122. The unwanted data is sensor data 116 that is not useful or that is less useful in generating the parking map data 120 and/or the parking service data 122. The parking data system 104 is configured to build the parking map data 120 with the useful data of the sensor data 116, and is configured to discard the unwanted data of the sensor data 116 according to the filtering process.

Exemplary useful data of the sensor data 116 includes sensor data 116 corresponding to the length 316 of the parking space 308, imaging data 172 of a parking space 308 or the area near the parking space 308, radar data 180 of a parking space 308 or the area near the parking space 308, LIDAR data 184 of a parking space 308 or the area near the parking space 308, ultrasonic data 176 of a parking space 308 or the area near the parking space 308, and location data 188 of a parking space 308 or the area near a parking space 308. Moreover, for example, useful data of the sensor data 116 includes imaging data 175 of a street 304 without sufficient room for parking vehicles, as this sensor data 116 is valuable for identifying areas in which the vehicles 108 cannot be parked. Unwanted data of the sensor data 116 includes data that is unusable by the parking data system 104 in generating and/or updating the parking map data 120 and/or the parking service data 122, and includes, for example, blurry imaging data 172 that was generated by a fast moving vehicle 108, incomplete sensor data 116, and redundant sensor data 116.

Figure 4:
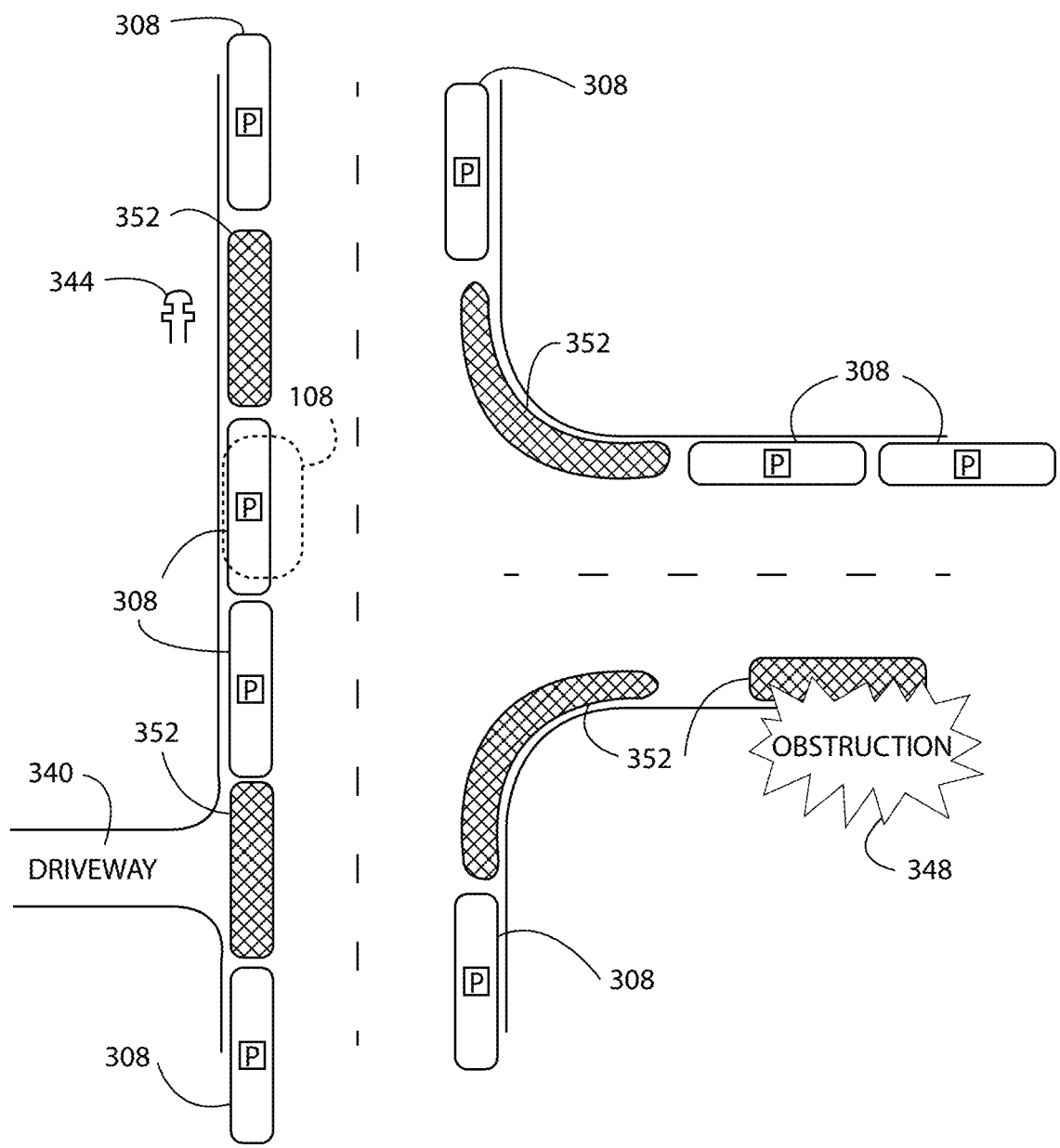
FIG. 4 is a block diagram illustrating another exemplary street portion, several parking spaces, and several no-parking spaces.

Next, at block 282 of the flowchart of FIG. 2, the method 270 includes using the filtered sensor data 116 to generate the parking map data 120. A representation of the parking map generated from the parking map data 120 is depicted in FIG. 4. As illustrated, the parking area map includes a t-intersection 336 (i.e. a roadway intersection), a driveway 340, a hydrant 344, an obstruction 348, vehicle parking spaces 308, and no-parking areas 352. The data corresponding to the parking spaces 308 is generated using the sensor data 116, which identifies areas suitable for parking a vehicle 108. For example, as one of the vehicles 108 moves along the street 304, the sensor data 116 generated by the vehicle 108 identifies that another vehicle 108 is parked at the parking space 308D. When this sensor data 116 is combined with corresponding sensor data 116 from multiple other vehicles 108 (of potentially multiple other OEMs), an algorithm of the parking data system 104 determines that the area located at parking space 308D is suitable for parking a vehicle 108 and the space is identified as a parking space 308 in the parking map data 120. Over time, using the sensor data 116 from multiple vehicles 108, the parking data system 104 gradually identifies all of the parking spaces 308 in the region 300.

Moreover, the parking data system 104 also uses the sensor data 116 to identify the no-parking areas 352 in which vehicles 108 should not park, such as near the intersection 336, in front of the driveway 340, near the hydrant 344, and close to the obstruction 352. For example, as one of the vehicles 108 moves along the street 304, the camera 124 generates imaging data 172 of the roadside that includes data corresponding to the fire hydrant 344. Typically, the parking data system 104 is coded with the information that motorists are not permitted to park within a predetermined distance of the hydrant 344. Thus, in building the parking area map, the parking map data 120 includes a no-parking area 352 in front of the hydrant 344. Similarly, imaging data 172 is generated near the intersection 336, the driveway 340, and the roadside obstruction 352 and is used by the parking data system 104 to identify other no-parking areas 352. Over time, using the sensor data 116 from multiple vehicles 108, the parking data system 104 gradually identifies all of the no-parking area 352 within the region 300.

In block 282, the parking data system 104 updates the parking map data 120 as the vehicles 108 in the region 300 generate sensor data 116 corresponding to new parking spots 308 and new no-parking areas 352. For example, in front of the obstruction 352 in FIG. 4 is presently identified as a no-parking area 352, because, in this example, a construction crew is repairing a water line in the area. When the construction crew completes the repair the obstruction 348 will be removed and the vehicles 108 in the region 300 will generate corresponding sensor data 116 enabling the parking data system 104 to identify the area as a parking space 308 and to update the parking map data 120 accordingly to change the no-parking area 352 to a parking space 308. All of the parking spaces 308 and the non-parking areas 352 are periodically updated and monitored to ensure that the correct status has been assigned by the parking data system 104.

Next, at block 286 of the flowchart of FIG. 2, the method 270 includes generating the parking service data 122, which identifies a status of each vehicle parking space 308 as either occupied or unoccupied. The parking data system 104 follows a community parking approach in which the vehicles 108 located in the region 300 scan the roadside for occupied and unoccupied parking spaces 308 using the vehicle sensors 124, 128, 132, 136, as the vehicles 108 traverse the roadways 304. Thus, the same sensors used in the vehicles 108 to detect the parking spaces 308 also detect if a particular parking space 308 is occupied by a parked vehicle 108, and is therefore unavailable, or is vacant and is available for another vehicle 108 to use for parking. The parking data system 104 uses the sensor data 116 to generate the parking service data 122, which is, in at least one embodiment, a real-time occupancy map of on-street parking spaces 308.

Figure 5:
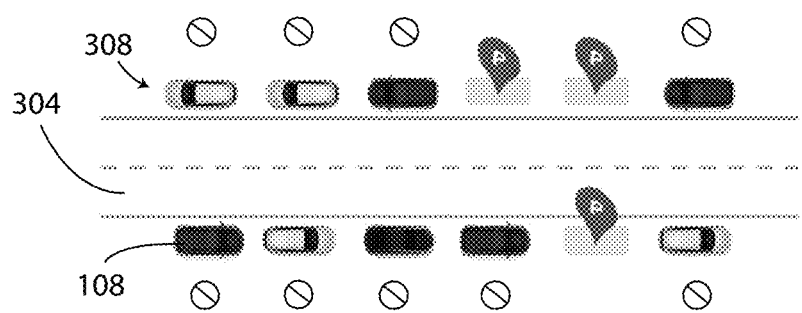
FIG. 5 is a block diagram illustrating yet another exemplary street portion having parking spaces several of which are occupied by vehicles and several of which are unoccupied by vehicles.

As shown in FIG. 5, a portion of the parking map data 120 is overlaid with a portion of the parking service data 122. The parking map data 120 includes data corresponding to the roadway 304 and the location and size (i.e. length and width) of the parking spaces 308. The parking service data 122 includes the present "real-time" availability of the parking spaces 308. As shown in the example of FIG. 5, seven of the parking spaces 308 are occupied by vehicles 108 and are presently unavailable, and three of the parking spaces 308 are unoccupied and are presently available for parking a vehicle 108. In generating the parking service data 122 of FIG. 5, at least one vehicle 108 has driven on the roadway 304 and has scanned the sides of the roadway 304 with the vehicle sensors 124, 128, 132, 136 to generate the sensor data 116. The sensor data 116 is transmitted to the parking data system 104 and is processed by an algorithm run by the controller 236 to arrive at the parking service data 122, which identifies the available or unavailability of the parking spaces 308.

Next, in block 290 of the flowchart of FIG. 2, the method 270 includes receiving a parking space location request from a particular vehicle 108 with the parking data system 104. The parking request is electronic data transmitted to the parking data system 104 that includes at least a location (from the GPS receiver 140, for example) and a request for a parking space 308. The parking request may originate from a human-operated vehicle 108 in which the person uses a smartphone, a cell phone, or the input 148, the GUI 200, and the display unit 144 to make the parking request. Additionally or alternatively, the parking request may originate from an autonomous vehicle 108 that is to be parked. The parking request may identify a size and/or a width of the vehicle 108 to be parked.

In response, to receiving the parking request, the parking data system 104 uses the parking map data 120 and the parking service data 122 to identify available parking spaces 308 located near the vehicle 108 that has made the parking request. Next, the parking data system 104 transmits parking space data to the particular vehicle 108 and/or the smartphone that has made the parking request. For a human operated vehicle, the parking space data may be displayed on the GUI 200 and the display 144 or displayed on a display of the smartphone. For an electronic autonomous vehicle 108 the parking space data is received and processed by a controller of the autonomous vehicle 108. After receiving the parking space data, the operator of the vehicle 108 may choose to park the vehicle 108 in the available parking space 308 corresponding the parking space data. As other vehicles 108 drive past the now parked vehicle 108, sensor data 116 is generated and transmitted to the parking data system 104, which causes the parking data system 104 to change the availability of the parking space 308 from available to unavailable in the parking service data 122.

In other embodiments, instead of the parking space data identifying only one available parking space 308, the parking data sent to the vehicle 108 includes a map of all of the nearby available parking spaces 308. The parking space data may be displayed on a display of a smartphone or the display 144 of the vehicle, for example, or may be overlaid upon the data of an in-vehicle navigation system.

The parking data system 104 solves a technical problem by supplying the operator of a vehicle 108 with the location of available parking spaces 308. Drivers in congested areas may spend many minutes searching for a parking space 308. The parking data system 104 uses community-sourced sensor data 116 to provide operators with the exact location of an available parking space 308. Thus, the parking data system 104 saves operators time and money by reducing the amount of fuel that is expended in searching for an available parking space 308.

The parking data system 104 is configured to operate with the sensor data 116 generated by vehicles 108 of any participating OEM. To encourage OEMs to configure their vehicles 108 to generate the sensor data 116, the parking data system 104 is configured to generate the valuation data 252 for fairly compensating OEMs based on the quantity and the quality of the sensor data 116 that is received by the parking data system 104. The monetary compensation owed to the various OEMs is represented by the valuation data 252, as generated by the data valuation engine 248. In one embodiment, OEMs receive compensation based on their vehicles 108 generating sensor data 116 that results in the parking map data 120 being updated with additional lengths 316 of parking spaces 308. An exemplary valuation approach is described below.

Figure 6:
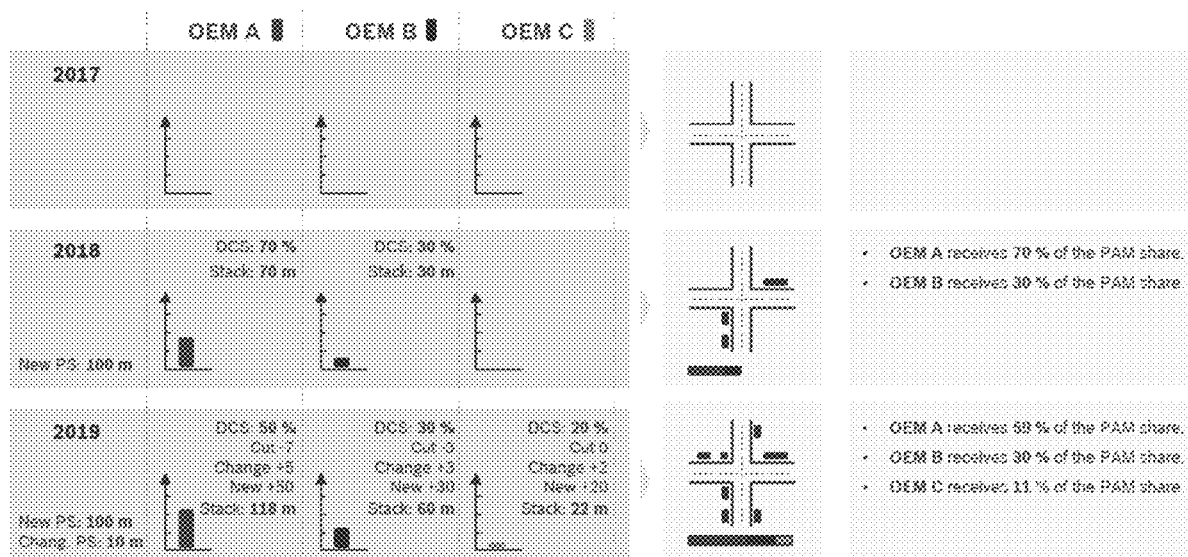
FIG. 6 is block diagram of a valuation approach utilized by the community parking system of FIG. 1 to compensate participating OEMs.

FIG. 6 illustrates a valuation approach in which the data valuation engine 248 of the parking data system 104 generates the valuation data 252 based on a percentage of the total length of the parking spaces 308 of the parking map data 120 attributable to the sensor data 116 from a particular OEM. In the valuation approach, each OEM holds a virtual stack of parking space length (measured in meters in one embodiment). The "height" or "length" of the stack represents the OEMs share of value. The data valuation engine 248 distributes new parking space length to the OEM stacks based on the OEMs contribution of valuable data points of the sensor data 116 (i.e. useful data, high-quality data, or valuable data). In this approach, changed parking space length is cut equally from the stacks of the OEMs, and then is distributed like new parking space length.

As shown in the year 2017, none of the OEMs have generated sensor data 116 that has contributed to the discovery of any parking spaces 308, and the valuation data 252 indicates that no payments are due to the OEMs. Then, in 2018, OEM A generates sensor data 116 that results in the parking data system 104 identifying seventy meters of parking space length, and OEM B has generated sensor data 116 that results in the parking data system 104 identifying thirty meters of parking space length. As a result, in 2018 the valuation data 252 indicates that OEM A has contributed 70% (i.e. a first percentage) of the valuable sensor data 116 and OEM A receives a 70% share of the available proceeds, and OEM B has contributed 30% (i.e. a second percentage) of the valuable sensor data 116 and OEM B receives a 30% share of the available proceeds. In 2019, OEM A generates sensor data 116 that results in fifty meters of new parking space length, OEM B generates sensor data 116 that results in thirty meters of new parking space length, and OEM C generates sensor data 116 that results in twenty meters of new parking space length. However, in 2019, ten meters of changed parking space length has also been identified. The valuation approach cuts the changed parking space length from the OEMs based on the previous year's ownership percentages, and then distributes the changed parking space length like new parking space length. Accordingly, the changed parking space length results in OEM A having seven meters (i.e. 70% of 10 m) removed from the stack and OEM B having three meters (i.e. 30% of 10 m) removed from the stack. Then, the changed parking space length is distributed as five meters to OEM A, three meters to OEM B, and two meters to OEM C based on the percentages of high-quality sensor data 116 that is newly discovered in the current year (i.e. 2019). The new totals for 2019 result in valuation data 252 that causes OEM A to receive 59% (i.e. a first percentage) of the available proceeds (i.e. $118/200$), OEM B to receive 30% (i.e. a second percentage) of the available proceeds (i.e. $60/200$), and OEM C to receive 11%

(i.e. a third percentage) of the available proceeds (i.e. 22/200). The valuation approach, therefore, has a first-mover advantage while also having an equitable distribution of changes in the "ownership" of the parking space length based on changes.

Based on the above, the parking data system 104 also solves a technical problem of equitably compensating OEMs that choose to participate in the generation and submission of sensor data 116 to the parking data system 104. The parking data system 104 recognizes that quality sensor data 116 is valuable, and the valuation approach incentivizes OEMs to produce vehicles 108 that generate high-quality sensor data 116.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following embodiments.

What is claimed is:

1. A method of operating a community parking system, comprising:
    generating sensor data with a plurality of cameras, each camera of the plurality of cameras mounted on a corresponding vehicle of a plurality of vehicles;
    transmitting the sensor data from the plurality of vehicles to a parking data system;
    processing the transmitted sensor data with the parking data system to generate new parking spot data identifying locations of vehicle parking spaces and new no-parking area data identifying locations a vehicle should not park;
    generating parking map data with the parking data system, the parking map data including a location of the vehicle parking spaces;
    updating the parking map data (i) to include additional vehicle parking spaces based on the new parking spot data, and (ii) to remove vehicle parking spaces based on the new no-parking area data;
    generating parking service data with the parking data system based on the sensor data and the updated parking map data, the parking service data identifying a status of each of the vehicle parking spaces as either occupied or unoccupied; and
    transmitting the parking service data and the parking map data to a particular vehicle of the plurality of vehicles to assist an operator of the particular vehicle in locating one of the vehicle parking spaces having an unoccupied status.

2. A method of operating a community parking system, comprising:
    generating sensor data with a plurality of vehicles corresponding to vehicle parking spaces and parked vehicles located in a region;
    transmitting the sensor data to a parking data system;
    generating parking map data with the parking data system based on the sensor data, the parking map data including a location of the vehicle parking spaces;
    generating parking service data with the parking data system based on the sensor data, the parking service data identifying a status of each vehicle parking space as either occupied or unoccupied; and
    transmitting the parking service data to a particular vehicle of the plurality of vehicles to assist an operator of the particular vehicle in locating one of the vehicle parking spaces having an unoccupied status,
    wherein the parking map data includes a first percentage of the sensor data from a first original equipment manufacturer corresponding to a first plurality of the vehicle parking spaces;
    wherein the parking map data includes a second percentage of the sensor data from a second original equipment manufacturer corresponding to a second plurality of the vehicle parking spaces; and
    wherein revenue is divided amongst the first original equipment manufacturer and the second original equipment manufacturer based on the first percentage and the second percentage.

3. The method as claimed in claim 2, wherein:
    the parking map data includes a third percentage of the sensor data from a third original equipment manufacturer corresponding to a third plurality of the vehicle parking spaces; and
    revenue is divided amongst the first original equipment manufacturer, the second original equipment manufacturer, and the third original equipment manufacturer based on the first percentage, the second percentage, and the third percentage.

4. The method as claimed in claim 1, wherein:
    a first vehicle of the plurality of vehicles is manufactured by a first original equipment manufacturer and is configured to generate the sensor data;
    the particular vehicle of the plurality of vehicles is manufactured by a second original equipment manufacturer; and
    the first original equipment manufacturer is different than the second original equipment manufacturer.

5. The method as claimed in claim 1, wherein:
    the new no-parking area data includes image data corresponding to obstructions, driveways, and roadway intersections generated by the plurality of cameras.

6. The method as claimed in claim 1, wherein the new parking spot data includes images of street-side parking spaces generated by the plurality of cameras.

7. The method as claimed in claim 1, wherein generating the sensor data further comprises:
    generating radar data with a plurality of radar sensors, each radar sensor of the plurality of radar sensors mounted on a corresponding vehicle of the plurality of vehicles.

8. The method as claimed in claim 1, further comprising:
    receiving a parking space location request from the particular vehicle; and
    displaying the transmitted parking service data on a graphical user interface of a display device of the particular vehicle.

9. The method as claimed in claim 1, wherein the parking map data is further generated based on a roadways map of a region in which the vehicle parking spaces are located.

10. A parking data system, comprising:
    a network adapter configured to receive sensor data generated by a plurality of cameras, each camera of the plurality of cameras mounted on a corresponding vehicle of a plurality of vehicles; and
    a controller operably connected to the network adapter and configured to:
        process the transmitted sensor data to generate new parking spot data identifying locations of vehicle parking spaces and new no-parking area data identifying locations a vehicle should not park;

generate parking map data, wherein the parking map data includes a location of the vehicle parking spaces;

updating the parking map data (i) to include additional vehicle parking spaces based on the new parking spot data, and (ii) to remove vehicle parking spaces based on the new no-parking area data;

generate parking service data with the parking data system based on the sensor data and the updated parking map data, wherein the parking service data identifies a status of each of the vehicle parking spaces as either occupied or unoccupied; and transmit the parking service data and the parking map data to a particular vehicle of the plurality of vehicles to assist an operator of the particular vehicle in locating one of the vehicle parking spaces having an unoccupied status.

11. The parking data system as claimed in claim 10, wherein the operator is an electronic autonomous operator of the particular vehicle.

12. The parking data system as claimed in claim 10, wherein:

the new no-parking area data includes image data corresponding to obstructions, driveways and roadway intersections generated by the plurality of cameras.

13. The parking data system as claimed in claim 10, wherein the new parking spot data includes images of street-side parking spaces generated by the plurality of cameras.

14. The parking data system as claimed in claim 10, wherein the parking map data is further generated based on a roadways map of a region in which the vehicle parking spaces are located.

15. The parking data system as claimed in claim 10, wherein:

the parking map data includes a first percentage of data from a first original equipment manufacturer corresponding to a first plurality of the vehicle parking spaces;

the parking map data includes a second percentage of data from a second original equipment manufacturer corresponding to a second plurality of vehicle parking spaces; and the controller is further configured to divide revenue amongst the first original equipment manufacturer and the second original equipment manufacturer based on the first percentage and the second percentage.

16. The parking data system as claimed in claim 15, wherein:

the parking map data includes a third percentage of data from a third original equipment manufacturer corresponding to a third plurality of vehicle parking spaces; and the controller is further configured to divide the revenue amongst the first original equipment manufacturer, the second original equipment manufacturer, and the third original equipment manufacturer based on the first percentage, the second percentage, and the third percentage.

* * * * *